Patented Oct. 30, 1951

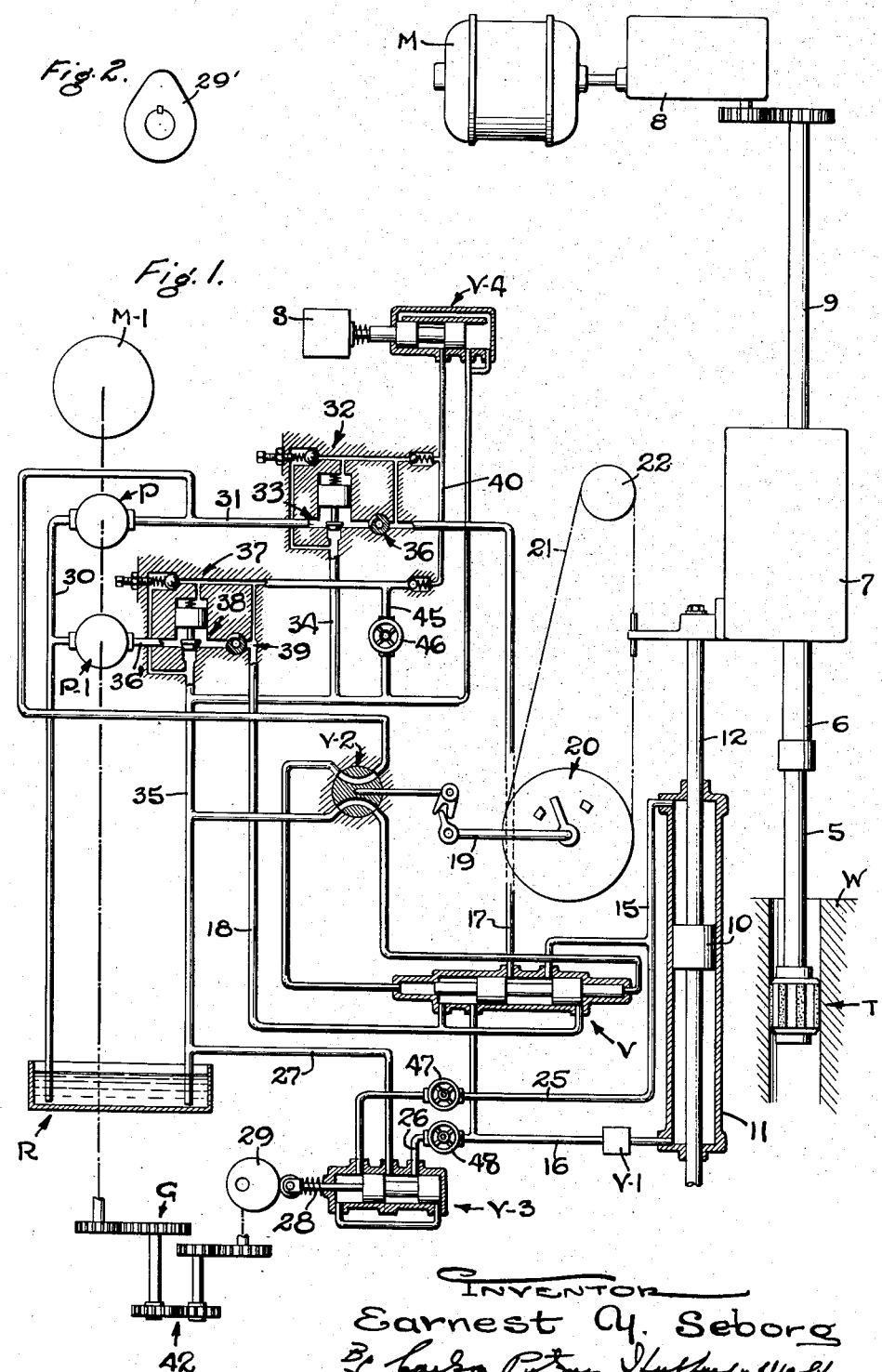

2,573,368

UNITED STATES PATENT OFFICE 2,573,368

RECIPROCATORY DRIVE FOR MACHINE TOOLS

Earnest Y. Seborg, Rockford, Ill., assignor to Barnes Drill Co., Rockford, Ill., a corporation of Illinois Application December 22, 1947, Serial No. 793,229

8 Claims. (Cl. 121—45)

1

The invention relates generally to machine tools of the type having a movable element such as a tool support or work support, and it is concerned more particularly with pressure fluid operated means for driving the movable machine element.

The invention finds particular utility in machine tools such as those employed in finishing cylindrical surfaces in which a cylindrical abrasive tool and the work are relatively reciprocated and simultaneously relatively rotated. To this end, the tool and the work are carried on separate supports, one of which is stationary and the other reciprocable. In operation, the latter support is reciprocated through a stroke adapted to traverse the tool from one end to the other of the surface being operated on.

In honing or lapping certain types of workpieces, as, for example, short workpieces and those having so-called "blind end" bores in which a transverse shoulder or other obstruction limits travel of the tool, it has been found advantageous to superimpose a secondary movement comprising a series of short reciprocatory movements on the normally long reciprocating stroke of the movable support. As a result of these combined movements, coupled with the relative rotation of the tool and work, the tool is traversed along a generally inclined sinusoidal path over the surface of the work.

In honing or lapping machines as heretofore constructed, the long reciprocating strokes are usually imparted to the movable support by a pressure fluid operated actuator, while the short strokes are obtained by mechanical means such as a cam or eccentric driver. While this arrangement has proved entirely satisfactory in small machines, it has been found impractical to provide suitable mechanical short-stroking means in heavy duty machines because of the great mass of the reciprocating parts.

With the above in view, one object of the invention is to provide an improved pressure fluid system for machine tools of the above general character whereby the advance of the moving support with periodic reversal is effected solely by the fluid operated actuator associated with the support.

A more specific object is to provide driving means for a movable machine element adapted to impart to the element a series of oppositely directed movements, in which the movements in one direction are of greater amplitude than the movements in the opposite direction, so that the element is advanced progressively in the direction of the strokes of greater amplitude.

2

Another object is to provide a drive mechanism for machine tool elements in which the amplitude of the movements of the element in opposite directions may be adjusted independently.

A further object is to provide a drive mechanism which may be quickly and easily adapted for imparting to a movable machine tool element either uniform continuous reciprocation or reciprocation with periodic short reversals.

Other objects and advantages of the invention will become apparent from the following detailed description of the preferred embodiment illustrated in the accompanying drawing, in which:

Figure 1 is a diagrammatic representation of the fluid driving and controlling system of a machine tool embodying the features of the invention.

Fig. 2 is a side view of a modified form of valve actuating cam.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For purposes of illustration, the invention has been shown as incorporated in a honing machine of the type in which a cylindrical abrasive tool T is rotated and simultaneously reciprocated axially in the bore of a stationarily supported workpiece W. The tool is supported at one end of an elongated driver 5 carried by a spindle 6 which is journaled in a head 7 supported and guided in any suitable manner for movement toward and from the work. The spindle 6 is adapted to be rotated by a motor M through a transmission 8 and a drive shaft 9.

In the exemplary machine, the head 7 which constitutes the movable machine element, is reciprocated by a pressure fluid operated actuator comprising, in this instance, a double-acting cylinder and piston mechanism including a piston 10 working in a cylinder 11. The piston is operatively connected with the head 7 by a piston rod 12 which is preferably extended through the piston and the opposite end of the cylinder 11 so as to provide equal effective areas at both ends of the piston.

In accordance with the invention, the cylinder 11 is supplied with pressure fluid under control of suitable valves interconnected and related in a novel manner so as to effect reciprocation of the head 7 through its full range of travel either with a uniform continuous movement or in a succession of oppositely directed movements or strokes which differ in amplitude in accordance with the direction in which the head is intended to progress. Provision is also made so that the amplitude of such movements may be varied to determine the rate at which the head progresses in a selected direction.

Referring more particularly to Fig. 1 of the drawing, pressure fluid is supplied to the opposite ends of the cylinder 11 through conduits 15 and 16 which are adapted to be connected alternately to supply conduits 17 and 18 by a reversing valve V. When the cylinder 11 is disposed in a vertical position, a resistance or foot valve V-1 is interposed in the conduit 16 leading to the lower end of the cylinder to prevent creeping or undesired descent of the head 7 during idle periods.

The valve V, as herein shown, is a conventional fluid operated four-way spool type valve shiftable between its two alternate positions under control of a pilot valve V-2. The valve V-2 is a two-position rotary valve and is arranged for actuation in timed relation to the reciprocation of the head 7. Actuation of the pilot valve is effected by a rockshaft 19 and a control member 20 associated therewith. The control member is oscillated in response to the reciprocation of the head 7 by a flexible member, such as a chain, connected with the head and running over a sprocket wheel rigid with the control member and over a second sprocket wheel 22.

Provision is made for delivering a constant supply of pressure fluid to the conduits 17 and 18 whereby both ends of the cylinder 11 are maintained under constant pressure. To effect reciprocation of the piston 10 in the cylinder, opposite ends of the cylinder are vented alternately so as to relieve the pressure on the corresponding ends of the piston, the latter moving toward the vented end of the cylinder under the pressure of the fluid supplied to the other end of the cylinder.

For venting the ends of the cylinder 11, branches 25 and 26 of the conduits 15 and 16 are extended to a two-position valve V-3 operable to alternately block one of the branches while connecting the other to an exhaust conduit 27. In the exemplary embodiment, the valve V-3 is biased by a spring 28 to a position effective to vent the upper end of the cylinder 11 and is shifted to its alternate position to vent the lower end of the cylinder by an actuator 29 herein shown as a cam and driven in a manner described hereafter.

In order to effect the progressive advance of the head 7 through its full range of travel while it is being reciprocated in relatively short strokes under control of the valve V-3, provision is made for regulating the fluid flow in the supply conduits 17 and 18 so that the movements imparted to the head in one direction are of greater amplitude than the movements imparted to it in the other direction. While such differential movement may be obtained by varying the pressure of the fluid in the supply conduits, it is preferred to vary the volume of fluid flow while maintaining substantially equal pressures in both conduits.

The pressure fluid supply for the conduits 17 and 18 may be derived from any suitable source. As herein shown the conduits are supplied with fluid from separate pumps, each having its own individual pressure and volume control instrumentalities. Thus, the conduit 17 receives pressure fluid from a pump P arranged to draw fluid through an intake conduit 30 from a sump or reservoir R and to discharge it under pressure through a conduit 31 leading to a control unit 32. The unit 32 includes a pressure regulating valve 33 adapted to maintain a constant pressure in the system and to divert excess fluid through an exhaust conduit 34 from which the fluid is returned to the sump R by a drain 35. The control unit 32 also includes a metering valve 36 adjustable to regulate the volume of fluid delivered to the conduit 17. Both of these valves may be of conventional construction.

Fluid is supplied to the conduit 18 by a pump P-1 which draws fluid from the sump R through the conduit 33 and discharges it under pressure through a conduit 36' leading to a control unit 37. The unit 37 is similar to the unit 32 above described and includes a pressure regulating valve 38 and a metering valve 39. The regulating valves of both units are connected with a common vent line 40 which is connected with the drain 35 through a stop valve V-4. The valve V-4 as shown is biased to an open position, but when the machine is in operation the valve is held in closed position by a solenoid S. With the vent line closed, the pressure regulating valves are effective to maintain the desired pressure in the system. When the stop valve is opened, the pressure regulating valves act to unload the pumps and divert the entire fluid supply to the drain 35.

As herein shown the pumps P and P-1 are driven by a motor M-1 which is also utilized to drive the cam actuator 29 for operating the valve V-3. The drive in this instance is through a gear train G which includes a set of change gears 42 adapted to be interchanged in well known manner to determine the rate of rotation of the cam actuator 29 and thus the rate of reciprocation of the head 7. For convenience of adjustment, the cam actuator 29 is shaped as shown in Fig. 1 to operate the valve V-3 so as to vent the opposite ends of the cylinder 11 for equal intervals of time.

In operating the machine in the preferred manner, one of the metering valves, as, for example, the valve 36, is adjusted to pass a greater volume of fluid than the other valve 39. With the reversing valve V set in the "down" position, as shown in the drawing, fluid supplied through the metering valve 36 and conduit 17 is directed through the conduit 15 to the upper end of the cylinder 11. Fluid supplied through the metering valve 39 and conduit 18 is directed through the conduit 16 to the lower end of the cylinder.

While the above conditions prevail, venting of either end of the cylinder 11 will initiate movement of the piston 10 toward that end of the cylinder, due to the pressure exerted by the fluid in the other end of the cylinder. Thus, when the valve V-3 is operated to the position in which it is shown, fluid flow through the conduit 16 and fluid from the lower end of the cylinder 11 is by-passed through the valve to the drain, thereby relieving the pressure on the lower end of the piston 10 and permitting it to advance with the head 7. Upon operation of the valve V-3 to its alternate position, branch line 26 is closed and branch line 25 is opened to by-pass fluid from the conduit 17 and the upper end of the cylinder 11 to the drain. The direction of travel of the piston is therefore reversed and the piston and head 7 moved upwardly.

Due to the difference in the volume of fluid delivered through the conduits 17 and 18, the head 7 is moved a greater distance in one direction than in the other; the downward movement being greater than the upward movement when the reversing valve V is set in the "down" position. The head therefore receives a downward increment in each operating cycle of the valve V-3 and the cumulative effect of these increments results in a progressive advance or descent of the head.

As the head 7 approaches the limit of its downward range of movement, pilot valve V-2 is operated to shift the reversing valve V to its alternate or "up" position. In that position the reversing valve connects the conduit 17 to the lower end of the cylinder 11 and the conduit 18 to the upper end of the cylinder. Accordingly, the head receives an upwardly directed increment in each operating cycle of the valve V-3, so that there is a gradual upward progression until the upper limit of its range of travel is reached. The pilot valve V-2 and reversing valve V are then re-operated to the "down" position to repeat the cycle as above described.

Under some conditions, it may be desirable to effect the differential stroking of the head 7 by varying the pressure of the fluid supplied to opposite ends of the cylinder 11. Such pressure variation may be obtained by adjustment of the pressure regulating valves 33 and 38, it being understood that appropriate adjustment of the metering valves 36 and 39 are also made at that time and the differential stroking is then obtained by the different rates of acceleration. The operating cycle of the machine in this case is exactly the same as that above described.

The differential stroking of the head 7 may also be obtained by manipulation of the valve V-3 so as to vent one end of the cylinder 11 for a longer period than the other end. For this purpose, the cam actuator 29 may be replaced by a suitably shaped cam 29', such as that shown in Fig. 2. When the machine is operated in this manner, the control devices 32 and 37 may be set so that the pumps P and P-1 deliver fluid at the same pressure and in substantially the same volume to the conduits 17 and 18.

Provision is made whereby the pressure fluid system may be quickly and easily conditioned to impart uniform continuous reciprocation to the support 7 so as to adapt the machine for the performance of conventional honing and lapping operations. For this purpose the control device 37 is provided with a by-pass conduit 45 by which the pressure regulating valve 38 may be vented to unload the pump P-1. A manually operable valve 46 interposed in the conduit 45 permits the by-pass to be opened or closed, as desired. Branch conduits 25 and 26 are also provided with manually operable valves 47 and 48 by which the branches may be closed off to render the valve V-3 ineffective to vent the ends of the cylinder 11. With valves 47 and 48 closed and the valve 46 open, fluid supplied by the pump P is directed by the reversing valve alternately to the upper and lower ends of the cylinder 11. Conduit 18, which is connected alternately to the ends of the cylinder 11 by the valve V, serves in this instance as an exhaust line for directing spent fluid from the cylinder 11 to the sump R by way of a metering valve 39, regulating valve 38 and drain 35, the latter valve being opened to unload the pump P-1 as above explained. Under these conditions the head 7 is reciprocated uniformly and at a rate determined by the setting of the metering valve 36.

It will be apparent from the foregoing that the invention provides a fluid operated drive means of novel and advantageous character for traversing a movable machine tool element. Through the action of the drive means, the element is reciprocated in relatively short strokes and, at the same time, is advanced progressively through its full range of travel. This progressive advance is obtained by adjusting the mechanism so that the reciprocatory movements in one direction are of greater amplitude than the movements in the opposite direction. The drive mechanism is simple and rugged in construction, and is adapted to be quickly and easily conditioned for reciprocating the machine tool element uniformly in the conventional manner.

I claim as my invention:

1. In a machine tool having a translatable element, in combination, a double acting cylinder and piston mechanism operatively connected with said element for imparting movements thereto in opposite directions, a first source of pressure fluid connected to one end of said cylinder, a second source of pressure fluid connected to the other end of said cylinder, valve means, and means for operating said valve means to vent the opposite ends of said cylinder alternately for equal intervals of time and thereby render said pressure fluid sources effective to impart successive oppositely directed movements to said element, one of said fluid sources being effective to supply working fluid at a greater volumetric rate than the other so as to impart a greater movement to said element than the other fluid source whereby said element is advanced progressively in one direction.

2. In a machine tool having a translatable element, in combination, a reversible pressure fluid operated actuator associated with said element for imparting movements thereto in opposite directions, a first source of pressure fluid for operating said actuator to move said element in one direction, a second source of pressure fluid for operating said actuator to move said element in the other direction, valve means operable to render said pressure fluid sources effective alternately to impart successive oppositely directed movements to said element, and actuating means for operating said valve means at substantially uniformly spaced intervals, said first source being operative to supply pressure fluid at a greater volumetric rate than said second source so that the movements of the element in one direction are of greater amplitude than its movements in the opposite direction and said element is thereby advanced progressively in said one direction.

3. In a machine tool, in combination, a reciprocable element, a double acting cylinder and piston mechanism operatively associated with said element, a pair of conduits communicating respectively with opposite ends of said cylinder, means for delivering a continuous supply of fluid under pressure to each of said conduits, valve means operable to alternately vent opposite ends of said cylinder and thereby cause said element to be moved first in one direction and then in the other direction, actuating means for operating said valve means at substantially uniformly spaced intervals, and metering valves for independently regulating the volumetric rate of fluid flow through said conduits to determine the amplitude of the movements imparted to said element in each direction.

4. In a machine tool, in combination, a reciprocable element, a double acting cylinder and piston mechanism operatively associated with said element, a pair of conduits communicating respectively with opposite ends of said cylinder, means for delivering a continuous supply of fluid under pressure to each of said conduits, a vent conduit, a two position valve operable to connect the opposite ends of said cylinder alternately to said vent conduit and thereby cause said element to be moved first in one direction and then in the other direction by the pressure of the fluid supplied to the non-vented end of the cylinder, and power actuated means for shifting said valve between said two positions at substantially uniformly spaced intervals.

5. In a machine tool, in combination, a reciprocable element, a double acting cylinder and piston mechanism operatively associated with said element, a pair of conduits communicating respectively with opposite ends of said cylinder, means for delivering a continuous supply of fluid under pressure to each of said conduits, a vent conduit, a two position valve operable to connect the opposite ends of said cylinder alternately to said vent conduit and thereby cause said element to be moved in one direction or the other, means for periodically shifting said valve means to alternate positions for substantially equal periods of time whereby to cause said element to be moved first in one direction and then in the other direction, and means for regulating the flow of pressure fluid through said supply conduits to determine the amplitude of the movements imparted to said element in each direction, said head advancing progressively in the direction of the movement of greatest amplitude.

6. In a machine tool, in combination, an element supported and guided for reciprocation, a double acting cylinder and piston mechanism operatively associated with said element, a pair of conduits communicating respectively with opposite ends of said cylinder, means for delivering a continuous supply of fluid under pressure to each of said conduits, valve means operable to alternately vent opposite ends of said cylinder for equal intervals of time and thereby cause said element to be moved first in one direction and then in the other direction by the pressure fluid supplied through said conduits, and means for independently regulating the rate of fluid flow through said conduits to determine the amplitude of the movements imparted to said element in each direction.

7. In a machine tool, in combination, an element supported and guided for reciprocation, a double acting cylinder and piston mechanism operatively associated with said element, a pair of conduits communicating respectively with opposite ends of said cylinder, means for delivering a continuous supply of fluid under pressure to each of said conduits, valve means operable to alternately vent opposite ends of said cylinder for equal intervals of time and thereby cause said element to be moved first in one direction and then in the other direction by the pressure fluid supplied through said conduits, and pressure control means associated with each of said conduits adjustable to independently regulate the pressure of the fluid supplied to the conduits for determining the amplitude of the movements imparted to said head in each direction.

8. In a machine tool, in combination, an element supported and guided for reciprocation, a double acting cylinder and piston mechanism operatively associated with said element, a pair of conduits communicating respectively with opposite ends of said cylinder, means for delivering a continuous supply of fluid under pressure to each of said conduits, valve means shiftable to either of two positions to vent opposite ends of said cylinder, and rotatably driven cam means operative to shift said valve periodically to cause said head to be moved first in one direction and then in the other direction, said cam being shaped to maintain said valve in one position for a longer interval than in the other position whereby successive increments of movement in one direction are imparted to said head.

EARNEST Y. SEBORG.

REFERENCES CITED

The following references are of record in the file of this patent:

UNITED STATES PATENTS

| Number | Name | Date |
|---|---|---|
| 2,020,847 | Mitereff | Nov. 12, 1935 |
| 2,055,530 | Hallenbeck | Sept. 29, 1936 |
| 2,073,518 | Hirvonen | Mar. 9, 1937 |
| 2,079,640 | Vickers | May 11, 1937 |
| 2,108,354 | Swanson | Feb. 15, 1938 |
| 2,324,727 | Shartle | July 20, 1943 |